(12) United States Patent
Loh et al.

(10) Patent No.: US 8,995,569 B2
(45) Date of Patent: Mar. 31, 2015

(54) QUADRATURE DIGITAL-IF TRANSMITTER WITHOUT INTER-STAGE SAW FILTER AND DEVICES USING SAME

(75) Inventors: Lup Meng Loh, Plano, TX (US);
Imtinan Elahi, Richardson, TX (US);
Naveen Yanduru, San Diego, CA (US);
Michael L. Brobston, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 510 days.

(21) Appl. No.: 13/341,495

(22) Filed: Dec. 30, 2011

(65) Prior Publication Data
US 2013/0170581 A1 Jul. 4, 2013

(51) Int. Cl.
*H04L 25/49* (2006.01)
*H04L 25/03* (2006.01)
*H04L 27/20* (2006.01)
*H04L 27/00* (2006.01)

(52) U.S. Cl.
CPC .......... *H04L 25/03343* (2013.01); *H04L 27/20* (2013.01); *H04L 2027/0018* (2013.01)
USPC ......................................... 375/297; 375/296

(58) Field of Classification Search
CPC ................................................... H03F 1/3247
USPC ............... 375/297, 298, 295, 296; 455/232.1, 455/41.12
See application file for complete search history.

(56) References Cited

U.S. PATENT DOCUMENTS

| | | | | |
|---|---|---|---|---|
| 5,990,734 A * | 11/1999 | Wright et al. | ...................... | 330/2 |
| 6,876,839 B2 * | 4/2005 | Harris | ........................... | 455/141 |
| 6,931,343 B2 * | 8/2005 | Webster et al. | ............... | 702/107 |
| 6,940,916 B1 * | 9/2005 | Warner et al. | .................. | 375/261 |
| 7,065,334 B1 * | 6/2006 | Otaka et al. | ................ | 455/232.1 |
| 7,555,263 B1 * | 6/2009 | Rofougaran et al. | ........... | 455/20 |
| 7,848,450 B2 * | 12/2010 | Jaganathan et al. | .......... | 375/296 |
| 8,645,445 B2 * | 2/2014 | Bal et al. | ....................... | 708/313 |
| 2003/0043929 A1 * | 3/2003 | Sampath | ...................... | 375/267 |
| 2004/0037366 A1 * | 2/2004 | Crawford | ...................... | 375/295 |
| 2005/0238116 A1 * | 10/2005 | Monta | ........................... | 375/298 |
| 2007/0001881 A1 * | 1/2007 | Piovaccari | .................... | 341/143 |
| 2008/0309524 A1 * | 12/2008 | Syllaios et al. | ................. | 341/61 |
| 2009/0170444 A1 * | 7/2009 | Retnasothie et al. | .......... | 455/73 |
| 2010/0124257 A1 * | 5/2010 | Yahya | ........................... | 375/219 |
| 2010/0226416 A1 * | 9/2010 | Dent et al. | .................... | 375/219 |

* cited by examiner

*Primary Examiner* — Shuwang Liu
*Assistant Examiner* — Helene Tayong

(57) ABSTRACT

An RF transmitter comprises a digital-to-IF circuit block configured to receive a digital in-phase baseband signal and a digital quadrature baseband signal and to up-convert the digital in-phase and quadrature baseband signals to a digital in-phase IF signal and to a digital quadrature IF signal. The wireless RF transmitter further comprises an IF-to-RF circuit block configured to convert the digital in-phase and quadrature IF signals to analog signals and to up-convert the analog in-phase and quadrature IF signals to an RF output signal. The digital-to-IF circuit block comprises pre-compensation circuitry configured to reduce analog impairments associated with the IF-to-RF circuit block.

20 Claims, 3 Drawing Sheets

QUADRATURE DIGITAL-IF TRANSMITTER WITHOUT INTER-STAGE SAW FILTER AND DEVICES USING SAME

TECHNICAL FIELD OF THE INVENTION

The present application relates generally to wireless transmitters and, more specifically, to a quadrature digital-IF transmitter without an inter-stage SAW filter.

BACKGROUND OF THE INVENTION

Conventional analog direct up-converters used in 2.5G/3G transmitters have inherent challenges that degrade output signal quality. Analog IQ mismatches directly contribute to the Error Vector Magnitude (EVM) of the signal, since these up-converters create an image that completely overlaps with that of the desired signal. The analog IQ baseband circuitry also creates DC components at the input of the quadrature direct up-converter, which in turns causes significant local oscillator (LO) feed-through that degrades EVM. Because analog circuits are susceptible to variations in process, voltages, and temperatures, it is difficult to design around such anomalies and it is required to use calibration to minimize these anomalies. Depending on the performance desired, the calibration routine may be a one-time occurrence or a continuous and dynamic process. In addition to the IQ mismatch problems, operating the transmitter LO at the same frequency as the assigned channel of the output signal subjects the synthesizer to "pulling" by the signal that causes frequency error and EVM degradation due to local oscillator (LO) pulling and pushing.

This is detrimental to the ability to isolate between the transmitter LO signal and transmitter output signal from inter-locking, especially since the output signal level after the power amplifier (PA) may easily be as high as 600 mW. As integrated circuit (IC) devices move towards ever smaller line widths, an entirely analog architecture is unable to exploit the advantages of size and power consumption. Smaller line widths also mean lower bias voltages, thereby limiting linearity performance. An entirely analog gain loop limits resolution.

One approach that is now obsolete among wireless terminal application specific integrated circuits (ASICs) is the all analog super-heterodyne architecture, where both up-converter stages are performed in the analog domain. While such an approach benefits from the single sideband (SSB) intermediate frequency-to-radio frequency (IF-RF) up-conversion that separates the carrier LO and the IQ image from the desired signal, it is subject to process, voltage, and temperature variations for both stages of the up-conversion process. This requires a much more complex IQ compensation algorithm for good image rejection. Dynamic IQ calibration is often needed to remove the inter-stage filter. Such an all analog architecture may not be able to benefit from a low line width CMOS process. It requires more silicon than other related solutions and often requires more frequency planning effort than direct up-conversion architectures.

Another architecture that found commercial applications in some narrowband systems (e.g., EDGE) is the Polar Loop architecture. This approach finds several implementations, such as a polar power amplifier (PA) module or an internal polar loop with either a pre-PA driver or a direct up-converter. While such designs offer an elegant technique for achieving a narrowband transmitter and have the original aim of improving efficiency, it is more difficult to use to support broadband signals. One of the difficulties is the timing match-up between the amplitude path and the phase path, both of which are frequency dependent. Techniques have been used to alleviate this issue, but these techniques require a digital pre-PA and introduce spurious images. The tighter the EVM requirement, the more stringent the timing matchup must be. Also, the transmit synthesizer operates at the same frequency as that of the assigned carrier, subjecting it to the same pulling as other designs.

Another type of architecture that is being considered for supporting broadband applications is the Digital-IF architecture using only a single DAC and single channel up-converter. While this architecture takes advantage of digital baseband-to-intermediate frequency (BB-IF) blocks, it requires an inter-stage SAW filter to help suppress the RF image created, because it is unable to provide any image rejection with a single IF-RF up-converter. Given that the image is similar in power to the desired signal, a third-order spurious image is created at the pre-PA driver as well as at the PA if it is not sufficiently suppressed by the inter-stage SAW filter.

SUMMARY OF THE INVENTION

To address the above-discussed deficiencies of the prior art, it is a primary object to provide an improved wireless radio-frequency (RF) transmitter. The RF transmitter comprises a digital-to-intermediate frequency (IF) circuit block configured to receive a digital in-phase baseband signal and a digital quadrature baseband signal and to up-convert the digital in-phase baseband signal and the digital quadrature baseband signal to a digital in-phase IF signal and a digital quadrature IF signal. The wireless RF transmitter further comprises digital-to-analog circuit blocks configured to convert the digital in-phase IF signal and the digital quadrature IF signal to analog in-phase IF and analog quadrature IF signals. A quadrature up-converter up-converts the analog in-phase IF signal and the analog quadrature IF signal to an RF output signal. Advantageously, the digital-to-IF circuit block comprises pre-compensation circuitry configured to reduce analog impairments associated with the IF-to-RF circuit block.

In one embodiment, the pre-compensation circuitry comprises at least one of: i) an interpolating filter; ii) an amplitude droop compensation filter; iii) a group delay compensation filter; and iv) an IQ-mismatch compensation filter.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
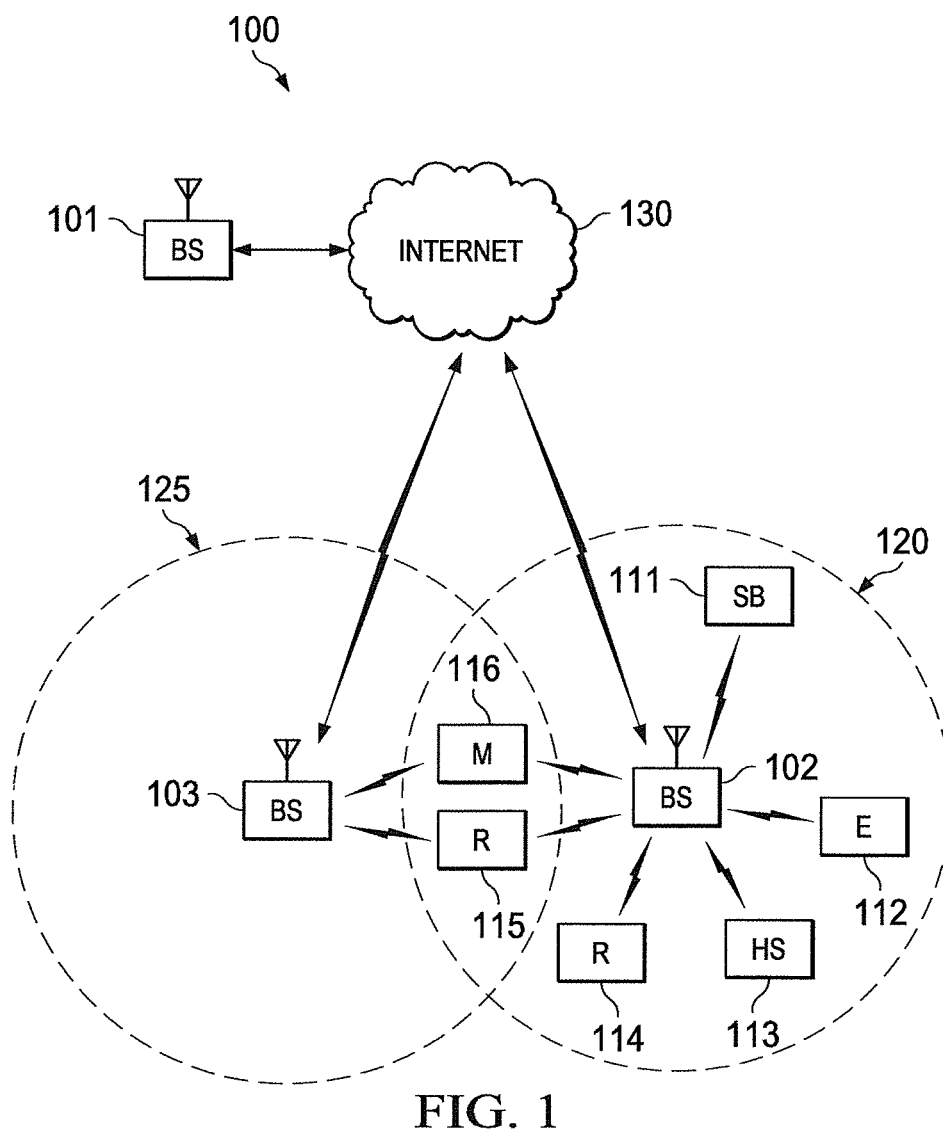
FIG. 1 illustrates an exemplary wireless network that includes mobile stations that implement quadrature digital intermediate frequency (IF) transmitters according to the principles of the present disclosure.
Figure 3:
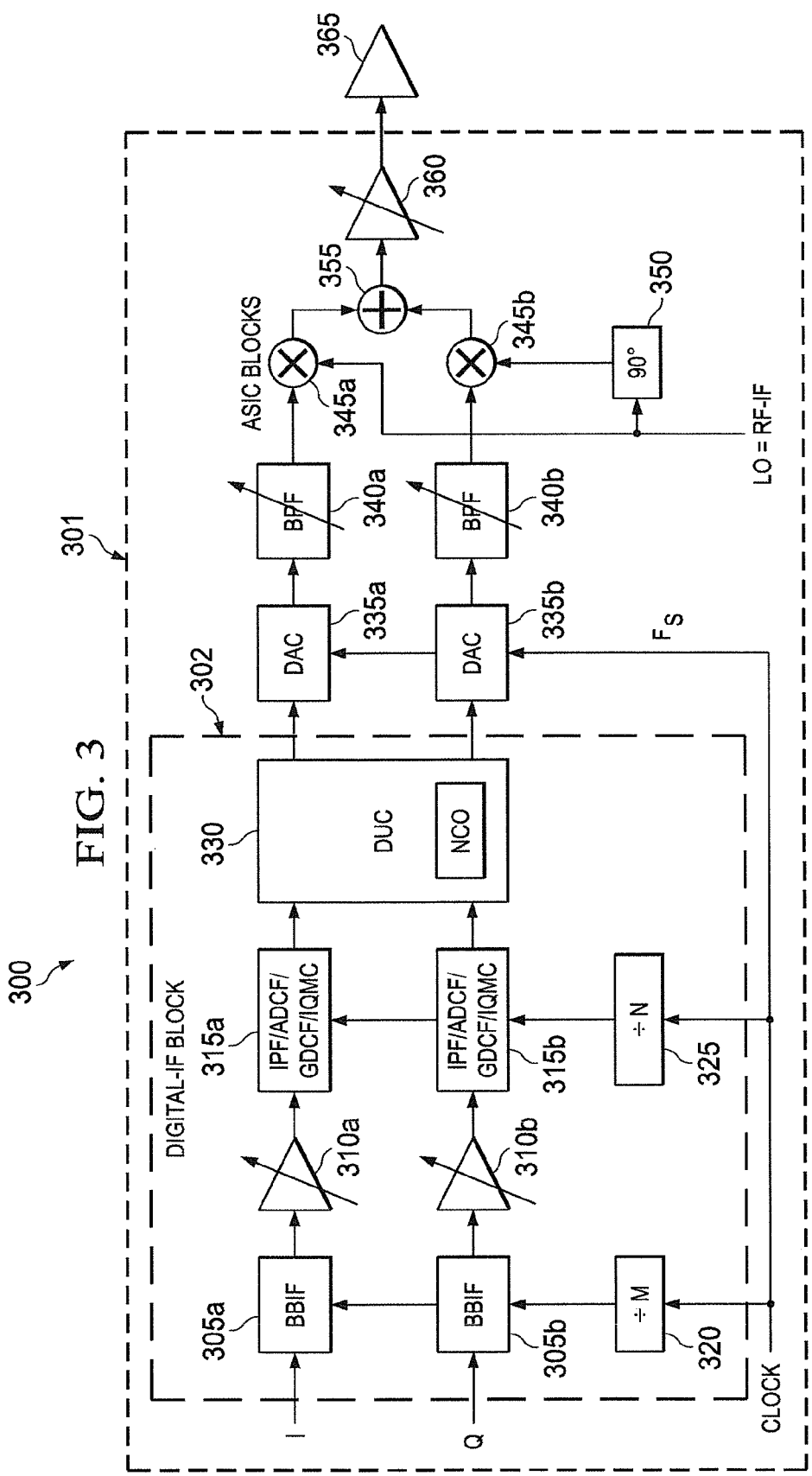
FIG. 3 illustrates a quadrature digital intermediate frequency (IF) transmitter block diagram according to an exemplary embodiment of the disclosure.

FIGS. 1 and 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged radio frequency (RF) transmitter.

FIG. 1 illustrates exemplary wireless network 100, which includes mobile stations that implement quadrature digital intermediate frequency (IF) transmitters according to the principles of the present disclosure. Wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations within coverage area 120 of base station 102. The first plurality of subscriber stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

Base station 103 provides wireless broadband access to Internet 130 to a second plurality of mobile stations in coverage area 125 of base station 103. The second plurality of mobile stations includes mobile station 115 and mobile station 116. In an exemplary embodiment, base stations 101-103 may communicate with each other and with mobile stations 111-116 using narrowband or broadband techniques, and frequency division duplexing (FDD) or time division duplexing (TDD) techniques.

The exemplary quadrature digital intermediate frequency (IF) transmitters disclosed herein may be implemented in a wide variety of radio frequency (RF) transmission devices, including, but not limited to, both the mobile stations and the base stations in FIG. 1 above. For the purposes of conciseness and simplicity, a quadrature digital intermediate frequency (IF) transmitter according to the principles of the present disclosure will be described below implemented in a mobile station. However, this exemplary embodiment should not be construed to limit the scope of the claims herein. The exemplary quadrature digital intermediate frequency (IF) transmitter may also be implemented in a base station, a relay station, a WiFi access point, and the like.

Figure 2:
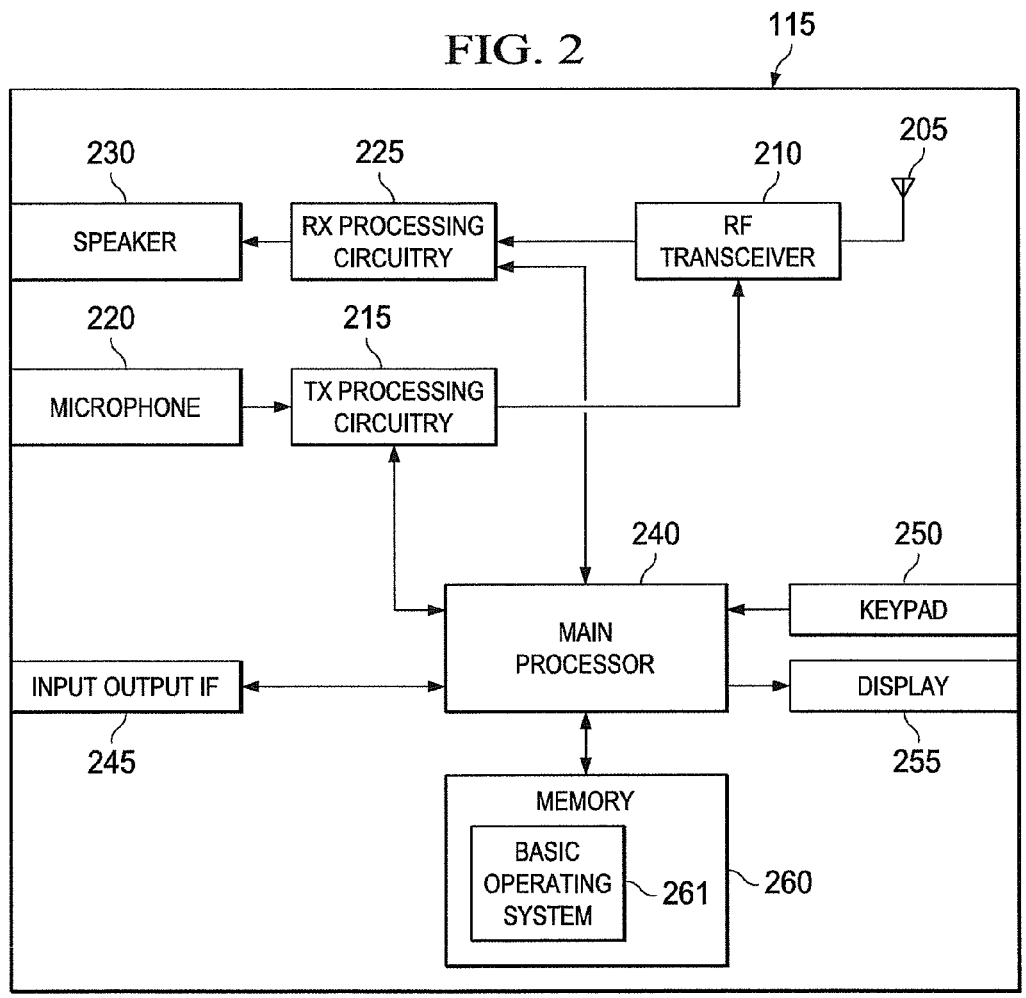
FIG. 2 illustrates a wireless mobile station that includes a quadrature digital intermediate frequency (IF) transmitter according to the principles of the present disclosure.

FIG. 2 illustrates wireless mobile station 115, which includes a quadrature digital intermediate frequency (IF) transmitter according to the principles of the present disclosure. Wireless mobile station 115 comprises antenna 205, radio frequency (RF) transceiver 210, transmit (TX) processing circuitry 215, microphone 220, and receive (RX) processing circuitry 225. MS 115 also comprises speaker 230, main processor 240, input/output (I/O) interface (IF) 245, keypad 250, display 255, and memory 260. Memory 260 further comprises basic operating system (OS) program 261.

Radio frequency (RF) transceiver 210 receives from antenna 205 an incoming RF signal transmitted by a base station of wireless network 100. Radio frequency (RF) transceiver 210 down-converts the incoming RF signal to produce a baseband signal. The baseband signal is sent to receiver (RX) processing circuitry 225, which produces a processed baseband signal by filtering and digitizing the baseband signal and, if necessary, demodulating and/or decoding. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, modulates, multiplexes, and/or digitizes the outgoing baseband data to produce a processed baseband signal. Radio frequency (RF) transceiver 210 receives the outgoing processed baseband signal from transmitter (TX) processing circuitry 215. Radio frequency (RF) transceiver 210 up-converts the baseband signal to an IF signal and then to a radio frequency (RF) signal that is transmitted via antenna 205.

In an advantageous embodiment of the present disclosure, main processor 240 is a microprocessor or microcontroller. Memory 260 is coupled to main processor 240. According to an advantageous embodiment of the present disclosure, part of memory 260 comprises a random access memory (RAM) and another part of memory 260 comprises a non-volatile memory, such as Flash memory, which acts as a read-only memory (ROM).

Main processor 240 executes basic operating system (OS) program 261 stored in memory 260 in order to control the overall operation of wireless mobile station 115. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides mobile station 115 with the ability to connect to other devices such as laptop computers and handheld computers. I/O interface 245 is the communication path between these accessories and main controller 240.

Main processor 240 is also coupled to keypad 250 and display unit 255. The operator of mobile station 115 uses keypad 250 to enter data into mobile station 115. Display 255 may be a liquid crystal display capable of rendering text and/or at least limited graphics from web sites. Alternate embodiments may use other types of displays.

FIG. 3 illustrates a block diagram of quadrature digital intermediate frequency (IF) transmitter 300 according to an exemplary embodiment of the disclosure. Quadrature digital-IF transmitter 300 may comprise, for example, part of the transmission path circuitry of radio frequency transceiver 210 in FIG. 2. Quadrature digital-IF transmitter 300 comprises application specific integrated circuit (ASIC) block 301 and power amplifier (PA) module 365. ASIC block 301 comprises a digital-to-IF portion that up-converts digital baseband (BB) signals to digital intermediate frequency (IF) signals, DAC blocks that convert the digital IF signals to analog IF signals, and analog IF-to-RF blocks that up-convert the analog IF signals to RF signals.

ASIC 301 comprises digital-IF block 302, which up-converts the digital BB signals to digital IF signals. Digital-IF block 302 comprises an in-phase (I) data transmission path that receives in-phase (I) data and a quadrature data transmission path that receives quadrature (Q) data. The in-phase data transmission path includes baseband interface (BBIF) 305a, digital variable gain amplifier (DVGA) 310a, and filter block 315a. The quadrature data transmission path includes baseband interface (BBIF) 305b, digital variable gain amplifier (DVGA) 310b, and filter block 315b. Digital-IF block 302 further comprises divide-by-M circuit 320, divide-by-N circuit 325, and digital up-converter (DUC) block 330. Divide-by-M circuit 320 reduces the rate of a system Clock signal by a factor of M and divide-by-N circuit 325 reduces the rate of the system Clock signal by a factor of N.

BBIF 305a samples the in-phase data at a rate determined by the divided Clock signal from divide-by-M circuit 320. The in-phase data samples are amplified by DVGA 310a. The amplified in-phase data samples are then filtered by filter block 315a. Similarly, BBIF 305b samples the quadrature data at a rate determined by the divided Clock signal from divide-by-M circuit 320. The quadrature data samples are amplified by DVGA 310b. The amplified quadrature data samples are then filtered by filter block 315b.

According to the principles of the present invention, filter blocks 315a and 315b are used to pre-compensate in the digital domain for analog impairments that subsequently occur in the analog portions of quadrature digital-IF transmitter 300 (i.e., DAC 345a and DAC 345b, BPF 340a and BPF 340b, mixers 345a and 345b, etc.). Filter blocks 315a and 315b may comprises a plurality of common filter functions, including an interpolating filter (IPF), an amplitude droop compensation filter (ADCF), a group delay compensation filter (GDCF), and an IQ-mismatch compensation filter (IQMC).

The complex baseband signal, comprising the filtered in-phase output of filter block 315a and the filtered quadrature output of filter block 315b, is up-converted to a complex intermediate frequency (IF) signal, comprising an in-phase digital signal and a quadrature digital signal, by digital up-converter (DUC) block 330. DUC block 330 may include a numerically controlled oscillator (NCO).

ASIC 301 further comprises in-phase digital-to-analog converter (DAC) 335a that converts the in-phase digital IF signals from DUC block 330 to in-phase analog IF signals. The analog IF-to-RF portion comprises in-phase variable bandpass filter (BPF) 340a and in-phase mixer 345a. In-phase DAC 335a receives the intermediate frequency (IF) in-phase digital signal from DUC 330 and generates an IF in-phase analog signal. In-phase variable BPF 340a isolates the analog IF signal frequencies of interest. The filtered IF in-phase analog signal is one input to in-phase mixer 345a. The other input to in-phase mixer 345a is the local oscillator (LO) signal. The LO frequency is equal to the RF signal frequency plus or minus the IF signal frequency (i.e., LO=RF−IF or LO=RF+IF). In-phase mixer 345a up-converts the filtered IF in-phase analog signal to a first radio frequency (RF) signal.

The quadrature phase digital-to-analog (DAC) converter 335b of ASIC 301 converts the quadrature phase digital IF signal from DUC block 330 to a quadrature phase analog IF signal. The analog IF-to-RF portion of ASIC 301 further comprises quadrature variable bandpass filter (BPF) 340b and quadrature mixer 345b. Quadrature variable BPF 340b isolates the analog IF signal frequencies of interest from DAC 335b. The filtered IF quadrature analog signal is one input to quadrature mixer 345b. The other input to quadrature mixer 345b is a 90 degree phase-shifted copy of the local oscillator (LO) signal received from 90-degree phase-shift block 350. Quadrature mixer 345b up-converts the filtered IF quadrature analog signal to a second radio frequency (RF) signal.

Summing circuit 355 combines the first RF signal from mixer 345a and the second RF signal from mixer 345b to produce a third RF signal that is applied to pre-power amplifier stage(s) 360. The amplified output of pre-power amplifier stage(s) 360 is the output of ASIC 301 that is applied to the input of power amplifier module 365.

Digital-IF block 302 performs digital quadrature up-conversion of baseband signals to intermediate frequency (IF) signals and maintains a quadrature configuration through the digital-to-analog converters (DACs). Then IF-RF up-conversion is performed in the analog domain.

The unique architecture described above affords image rejection of the DAC output and at the RF output of the up-converter. This allows the transmitter to eliminate the inter-stage SAW filter commonly required in frequency division duplexing (FDD) operation. The use of proper frequency planning enables the Quadrature Digital-IF transmitter to minimize receiver band noise and to eliminate the inter-stage SAW filter. The ability to provide ample image rejection enables the transmitter to achieve sufficient image suppression relying only on an external duplexer when in FDD operation, which traditional digital-IF transmitter architectures are unable to do.

The operation of digital-IF block 302 in the digital domain affords much higher resolution and a more deterministic gain setting, distortion-free up-conversion, and a universal setting to pre-compensate for analog anomalies. Essentially, digital-IF block 302 takes over some of the functions from the analog domain. Advantageously, these same functions may be performed distortion free in the digital domain. As a result, calibration is simplified by focusing on the pre-compensation of just the IF and RF analog functions. The pre-compensation algorithm performed in the digital domain may achieve a high degree of accuracy without burdening the modem. The pre-compensation algorithm's higher degree of accuracy and immunity to variations facilitates a universal calibration approach, where coefficients for correcting IQ mismatch common to all mass produced ASICs, for example, may be predetermined by image power measurements in a laboratory environment, thereby alleviating the need for production line calibration, on/off calibration, or dynamic calibration during operations.

The digital-IF architecture removes IQ mismatches from contributing to the EVM degradation of the desired signal. It also offsets the carrier feedthrough so that it does not impact the EVM of the signal even at lower output levels. It pre-compensates distortions that arise from analog IF filtering and IF-RF up-conversion. The digital-IF architecture undertakes a portion of the gain dynamic range requirements, which reduces the design burden on the RF variable gain pre-PA 360.

The unique frequency planning for the digital-IF architecture supports various bands, particularly in FDD mode, and is important in the removal of inter-stage filtering. The IF selection is band specific and determines low-side or high-side injection, which is aimed at achieving the following; i) sufficient frequency offset for the carrier feedthrough to be filtered by the duplexer; ii) sufficient frequency offset for the RF image and conversion band noise to be filtered by the duplexer; iii) allowing a feasible implementation of IF analog filtering to suppress receive band noise; iv) avoiding spurious images or non-linear products to fall within the mobile station receive band; v) avoiding spurious images or non-linear products to fall within other receive bands that require more stringent limits; and vi) achieving the best compromise for DAC sampling rate to reduce power consumption.

As a result, the digital-IF architecture is capable of achieving superior EVM performance while doing away with the inter-stage SAW filter. It is important to note that this architecture is immune to LO pulling and pushing issues compared to direct up-conversion and polar architectures, thus further improving the EVM and close-in spectrum performance. The transmitter architecture defined in this disclosure is targeted for multi-mode and multi-band handset ASIC applications, where this common transmitter is capable of supporting broadband or narrowband, FDD or TDD type systems. The digital-IF architecture is well-suited for use in smaller line width CMOS processes, where the design can leverage on power savings and silicon area savings that are essential to mobile station (i.e., handset) design.

There are options for various Intermediate Frequency (IF) bands based on frequency planning. The present disclosure encompasses all IF ranges of the defined architecture that allows the carrier to be at least half of the RF signal bandwidth away from the assigned channel frequency of the desired signal. This facilitates high-side or low-side injection at the IF-to-RF up-conversion.

The quadrature digital-IF architecture uses this proper frequency planning to remove the inter-stage SAW filter, making it BOM competitive in costs as well as reducing the clutter in front end components on multi-mode, multi-band platforms. This design facilitates a common transmitter to handle WiMax/LTE TDD or FDD to WCDMA/CDMA signals at all the bands supported by the respective standards, making it an efficient design for multi-mode, multi-band wireless terminal applications.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless radio-frequency (RF) transmitter comprising:
    a digital-to-intermediate frequency (IF) circuit block configured to receive a digital in-phase baseband signal and a digital quadrature baseband signal and to up-convert the digital in-phase and quadrature baseband signals to a digital in-phase IF signal and a digital quadrature IF signal;
    a digital-to-analog (DAC) converter block configured to convert the digital in-phase IF signal and the digital quadrature IF signal to an in-phase analog IF signal and a quadrature analog IF signal respectively; and
    an IF-to-RF up-converter block configured to up-convert the analog in-phase IF signal and the analog quadrature IF signal to an RF output,
    wherein the digital-to-IF circuit block comprises:
        a plurality of variable gain amplifiers configured to amplify the digital in-phase baseband signal and the digital quadrature baseband signal; and
        pre-compensation circuitry configured to receive the amplified digital in-phase baseband signal and the amplified digital quadrature baseband signal from the variable gain amplifiers and reduce analog impairments associated with the IF-to-RF up-converter block using a programmable intermediate frequency, the pre-compensation circuitry comprising at least one filter.

2. The wireless radio-frequency (RF) transmitter as set forth in claim 1, wherein the at least one filter comprises an interpolating filter.

3. The wireless radio-frequency (RF) transmitter as set forth in claim 1, wherein the at least one filter comprises an amplitude droop compensation filter.

4. The wireless radio-frequency (RF) transmitter as set forth in claim 1, wherein the at least one filter comprises a group delay compensation filter.

5. The wireless radio-frequency (RF) transmitter as set forth in claim 1, wherein the at least one filter comprises an IQ-mismatch compensation filter.

6. The wireless radio-frequency (RF) transmitter as set forth in claim 1, wherein the plurality of variable gain amplifiers comprises a first variable gain amplifier configured to amplify the digital in-phase baseband signal.

7. The wireless radio-frequency (RF) transmitter as set forth in claim 6, wherein the plurality of variable gain amplifiers further comprises a second variable gain amplifier configured to amplify the digital quadrature baseband signal.

8. The wireless radio-frequency (RF) transmitter as set forth in claim 7, wherein the pre-compensation circuitry further comprises a plurality of baseband interfaces configured to sample the digital in-phase baseband signal and the digital quadrature baseband signal before the signals are amplified by the variable gain amplifiers.

9. The wireless radio-frequency (RF) transmitter as set forth in claim 8, wherein the pre-compensation circuitry comprises a divider circuit configured to reduce a rate of a system clock, the reduced rated used as a sampling rate by the baseband interfaces.

10. The wireless radio-frequency (RF) transmitter as set forth in claim 9, wherein the digital-to-IF circuit block further comprises a digital up-converter block configured to up-convert a filtered digital in-phase baseband signal and a filtered digital quadrature baseband signal received from the pre-compensation circuitry to produce the digital in-phase IF signal and the digital quadrature IF signal.

11. A mobile station for use in a wireless network, the mobile station including radio-frequency (RF) transmission circuitry comprising:
    a digital-to-intermediate frequency (IF) circuit block configured to receive a digital in-phase baseband signal and a digital quadrature baseband signal and to up-convert the digital in-phase and quadrature baseband signals to a digital in-phase IF signal and a digital quadrature IF signal;
    a digital-to-analog (DAC) converter block configured to convert the digital in-phase IF signal and the digital quadrature IF signal to an in-phase analog IF signal and a quadrature analog IF signal respectively; and an IF-to-RF up-converter block configured to up-convert the analog in-phase IF signal and the analog quadrature IF signal to an RF output, wherein the digital-to-IF circuit block comprises:

a plurality of variable gain amplifiers configured to amplify the digital in-phase baseband signal and the digital quadrature baseband signal; and pre-compensation circuitry configured to receive the amplified digital in-phase baseband signal and the amplified digital quadrature baseband signal from the variable gain amplifiers and reduce analog impairments associated with the IF-to-RF up-converter block using a programmable intermediate frequency, the pre-compensation circuitry comprising at least one filter.

12. The mobile station as set forth in claim 11, wherein the at least one filter comprises an interpolating filter.

13. The mobile station as set forth in claim 11, wherein the at least one filter comprises an amplitude droop compensation filter.

14. The mobile station as set forth in claim 11, wherein the at least one filter comprises a group delay compensation filter.

15. The mobile station as set forth in claim 11, wherein the at least one filter comprises an IQ-mismatch compensation filter.

16. The mobile station as set forth in claim 11, wherein the plurality of variable gain amplifiers comprises a first variable gain amplifier configured to amplify the digital in-phase baseband signal.

17. The mobile station as set forth in claim 16, wherein the plurality of variable gain amplifiers further comprises a second variable gain amplifier configured to amplify the digital quadrature baseband signal.

18. The mobile station as set forth in claim 17, wherein the pre-compensation circuitry further comprises a plurality of baseband interfaces configured to sample the digital in-phase baseband signal and the digital quadrature baseband signal before the signals are amplified by the variable gain amplifiers.

19. The mobile station as set forth in claim 18, wherein the pre-compensation circuitry comprises a divider circuit configured to reduce a rate of a system clock, the reduced rated used as a sampling rate by the baseband interfaces.

20. The mobile station as set forth in claim 19, wherein the digital-to-if circuit block further comprises a digital up-converter block configured to up-convert a filtered digital in-phase baseband signal and a filtered digital quadrature baseband signal received from the pre-compensation circuitry to produce the digital in-phase IF signal and the digital quadrature IF signal.

* * * * *